United States Patent Office 3,540,247
Patented Nov. 17, 1970

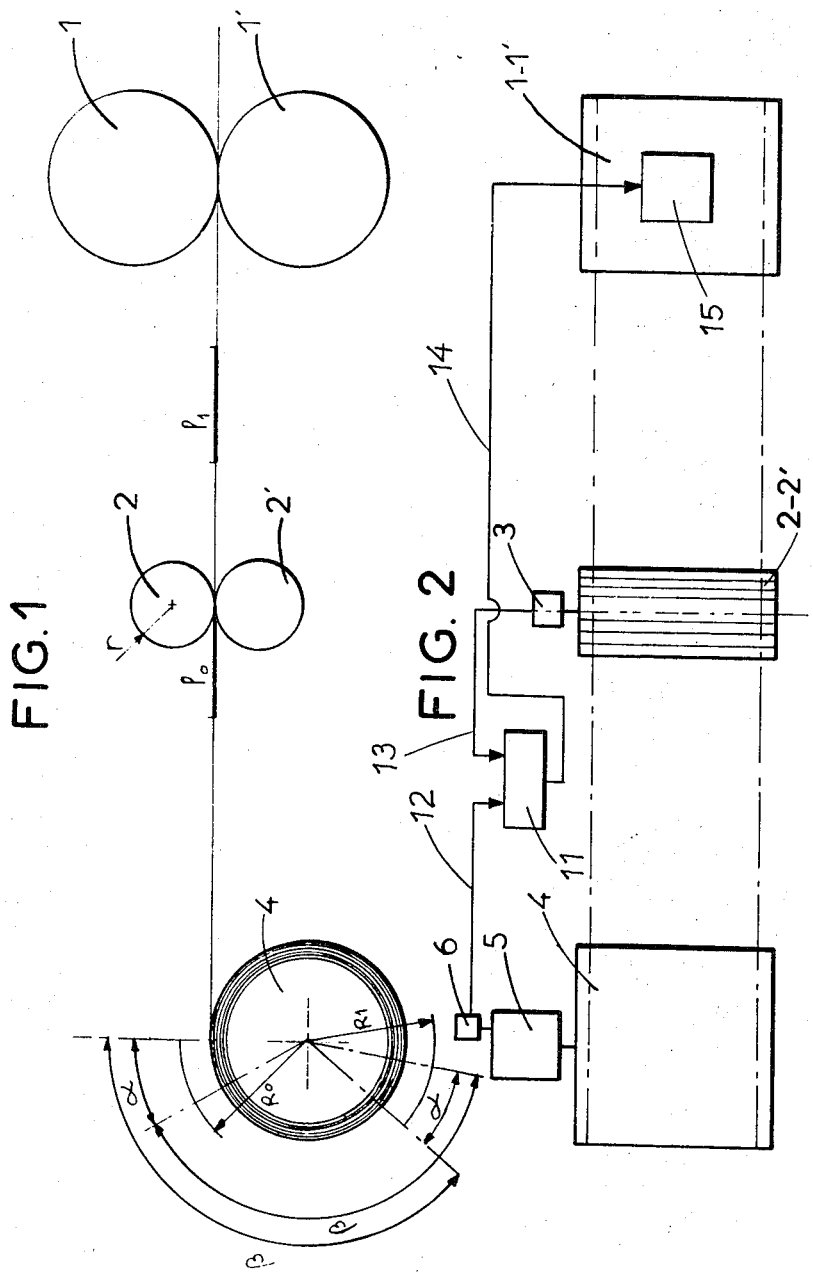

3,540,247
METHOD AND DEVICE FOR CONTROLLING OR MEASURING THE THICKNESS OF A BAND BEING REELED UP ON A DRUM IN A CONTINUOUS MOVEMENT
Lucien Diolot, Neuilly, France, assignor to Societe Nouville Spidem, Paris, France, a French corporation
Filed Jan. 3, 1968, Ser. No. 695,482
Claims priority, application France, Jan. 6, 1967, 90,322
Int. Cl. B21b *37/02*
U.S. Cl. 72—8                                         10 Claims

ABSTRACT OF THE DISCLOSURE

Process and apparatus for measuring and controlling the thickness of a moving strip as it is being coiled on a take-up drum by comparison—at any moment—between the linear distance covered by the strip at a point spaced from the drum and the angular reel-up distance on the drum.

---

There are many apparatuses which enable one to make a direct measurement of—or a comparison to a standard— of the thickness of a band or strip during its production; for example, a metal strip coming out of a rolling mill.

The rapid increase in rolling speed and the requirements for precision have rendered these apparatuses inadequate and have brought out their shortcomings which differ from one process to the next.

Devices in which there is contact between the measurement apparatus and the metal can cause streaks which damage the appearance of the finished product. Besides, their indications are often wrong due to heating as a result of contact. Induction measuring apparatuses are very sensitive to the temperature of the rolled product. It is impossible to measure this temperature because it varies in terms of thickness. Pneumatic measuring apparatus is limited as to the speed of the products to be measured and require the strip to be maintained at a constant and precise position. Measuring systems, with radioactive or electric sources, are influenced by the composition of the metal. This, in the end, makes it impossible to use them for alloys which have components with widely differing atomic numbers or specific weight.

In fact, the precision and the constancy of the material obtained from a rolling mill turning out flat-rolled products, featuring all of the points of perfection visualized today, will depend to a great extent on the precision and fidelity qualities of the measurement apparatus used. This is true even though this may involve only the correction of the drifts of the regulation system, based on rapid correction of the differences due to the variations in rolling pressure, used in the various means.

This invention relates to a method which does not entail any of the inconveniences mentioned above. It enables control and determination of the average thickness of a metallic or nonmetallic product over a determined distance without any need for rollers which keep the strip (band) on a constant course. Besides, the measurement will not be affected by the composition or temperature of the product. This applies to a very broad range of thicknesses and speeds; the only imperative requirement here is this: The rolling process must terminate in coiling the strip—which is now the general rule anyway.

The invention involves a method for measuring and/or controlling the thickness of a strip being continuously reeled up on a drum in compact coils. It is characterized by the means which, at any moment, compares the linear distance traveled by the strip and the related angular reel-up distance covered by this material length as it wraps itself about the drum. The knowledge of these two parameters enables one—by means of simple calculations which can be easily performed automatically with currently known means—to determine the thickness of the strip at any moment or at preset intervals.

It is easy to use this measurement by comparing it to a set index value so as to put out a regulation signal which acts upon the rolling mill control mechanism.

Another object of this invention involves a device for implementing the above-mentioned process, entailing essentially, a first counter which measures the angular displacements of the drum and a second counter which is moved by one of the shafts of two clamping rollers driven through a constant effort by the strip, prior to its arrival on the drum.

Another object of this invention involves such a device featuring a first angular distance counter driven directly or indirectly by the shaft of the drum and emitting signals while the drum rotates by a first angle $\alpha$ having a predetermined value. This happens every time the drum has turned through a second angle $\beta$ which likewise has a predetermined value. The device further features a second angular counter which is triggered by the signals from the first counter and which counts during the rotation of the drum over a value of $\alpha$, followed by a deduction count—during the following rotation—of a same value $\alpha$ of the drum. The remaining value by said second counter is constantly proportional to the average thickness of that portion of the strip which is just passing by.

Still another object of this invention involves an apparatus which emits a signal upon each turn or all of the $n$ number of turns of the drum indicated by said first counter, this signal being picked up by a receiver which indicates the proper angular position of one of the clamping rollers for each signal. The different arcs between the successive angular positions of said clamping roller are measured by said second counter and the constancy or variation of these arcs controls the constant nature or degree of variation of the average thickness of the strip which is just passing by.

This invention can be better understood with the help of the following specification referring to the attached drawing, where:

FIG. 1 is a schematic elevation view of a rolling mill with strip reeling drum, equipped with a control device according to this invention.

FIG. 2 is a schematic plan view showing the two counters.

Figure 3:
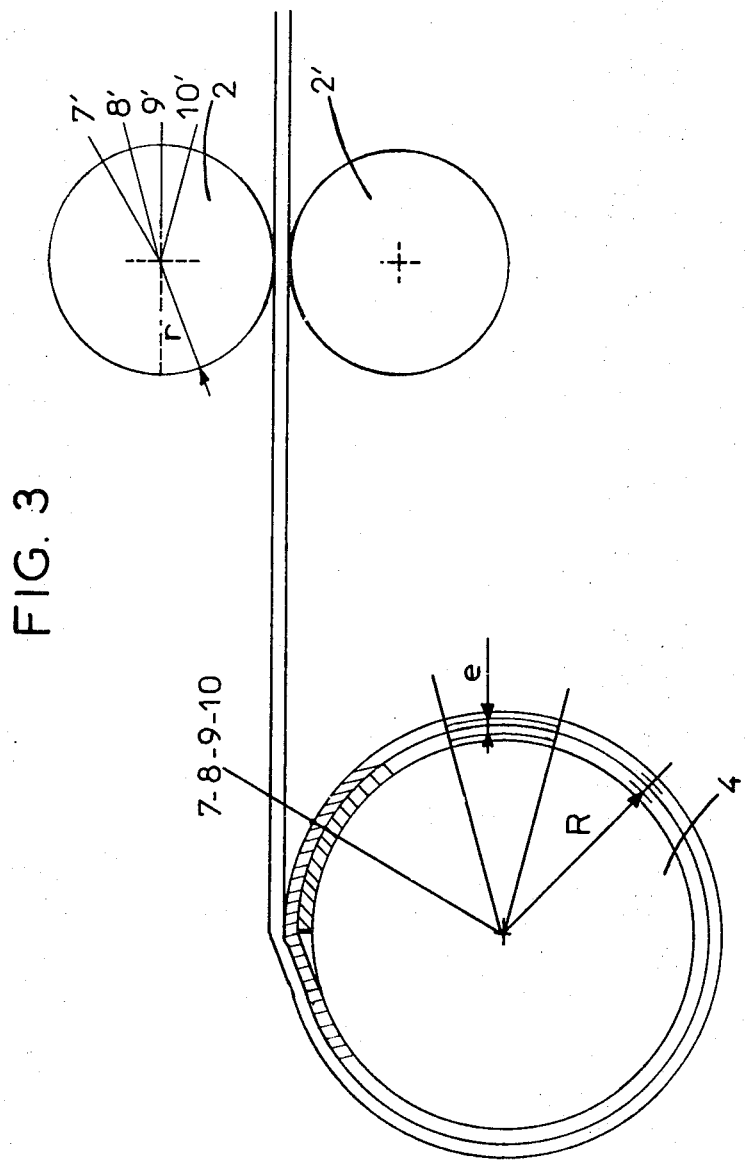
FIG. 3 is a schematic elevation view of one possible version of the device according to this invention.

Referring to FIG. 1, the strip coming out of a rolling mill involving cylinders 1 and 1', is pressed between two rollers or followers 2 and 2' by a precision force provided, for example, by a hydraulic jack with pressure regulator 15 so as to give a constant flat contact with the strip. These two rollers drive a conventional movement counter 3. The product to be measured is reeled up on a drum 4 in the form of concentric contacting coils as is done normally. On the shaft of this drum, or on a shaft revolving at a proportional number of turns, such as, one of the shafts of the drive motor reduction gear 5, for example, is another counter 6 which delivers signals at specifically determined positions.

The compact reel-up of the strip on the drum can be likened to an Archimedes screw and at each turn, the corresponding reel-up radius is augmented by the thickness of the product $e$.

If—while the windup drum performs a certain angular travel $\alpha$ corresponding to an average reel-up radius $Ro$—then the strip covers a distance $lo$ on clamping roller 2 with radius $r$ and counter 3 will register an angular course (travel):

$$\gamma_0 = \frac{lo}{r}$$

and we will then have the relationship:

$$Ro = \frac{lo}{\alpha} = \frac{\gamma_0 r}{\alpha} \quad (1)$$

If, after the drum has traveled $\beta$, we again measure the path $l_1$ covered by the strip during a drum rotation $\alpha$, we have an analog relation. The average radius now becomes:

$$R_1 = \frac{l_1}{\alpha} = \frac{\gamma_1 r}{\alpha} \quad (2)$$

Here $\gamma_1$ is the new anble registered by counter 3. As the radius increases regularly by thickness $e$ during one turn of the drum, we get:

$$R_1 - Ro = \frac{e\beta}{2\pi} = \frac{r(\gamma_1 - \gamma_0)}{\alpha} \quad (3)$$

from which we derive the value of $e$:

$$e = \frac{2\pi}{\beta} \frac{r}{\alpha} \left(\gamma_1 - \gamma_0\right)$$

We can determine $e$ from the difference $(\gamma_1 - \gamma_0)$ which can be measured by the known means.

For example, we can use a numerical counter which counts during the performance of a first arc $\alpha$ and which deducts during the second, so that the values given by this counter will be constantly proportional to the thickness $e$ of the strip. The choice of $\alpha$ and $\beta$ depends on the nature of the rolling process, the speed, the thickness of the product and the precision desired.

Assuming we measure the path traveled during two consecutive turns, we get:

$$\beta = \alpha = 2\pi$$

and the expression of the thickness looks like this now:

$$e = \frac{r}{2\pi}(\gamma_1 - \gamma_0)$$

When we work with very thin products, which are generally rolled at very great speeds and for which the thickness variations are progressive (keep increasing), we want to measure over several turns or revolutions—so as not to demand too much of counter 3 in the way of precision—and we proceed inversely, when we work with thick products rolled at slow speed.

One possible version of this invention is shown schematically in FIG. 3: Considering here a situation in which the strip is wound up on drum 4, the radius increases by $e$ ($e$ here being the thickness of the strip) upon each turn corresponding to an arc of $2\pi$.

If $R$ is the average radius corresponding to a coil or winding, then the length of the coil in position $(n-1)$ will be equal to:

$$2\pi[(R + e(n-2))]$$

while the length of the coil in position $n$ will be:

$$2\pi[(R + e(n-1))]$$

so that the extension by each coil is then:

$$2\pi[(R + e(n-1))] - 2\pi[(R + e(n-2))] = 2\pi e$$

This extension corresponds to N number of turns on follower (roller) 2 with constant radius $r$, and hence:

$$N = \frac{2\pi e}{2\pi r} = \frac{e}{r}$$

If drum 4 passes position 7, FIG. 3, a signal is transmitted by some known means; this signal being reproduced at the same instant on follower 2. We will then have a position 7' corresponding to position 7. Upon the next turn, a position 8' will correspond to position 8 on follower 2, and so on, for positions 9 and 10, since positions 7, 8, 9 and 10 are angularly identical.

If the thickness of the strip $e$ is constant, the arcs described on follower 2 (7'-8'), (8'-9'), (9'-10') will have to be equal. The measurement of these arcs by the corresponding counter will then, at any chosen instant, give us a reading as to the thickness of the strip, as well as its consistency or degree of variation. If necessary, these arcs will enable us to determine the thickness corresponding to each arc by means of a very simple method.

To determine an average thickness, all that is needed is to measure, for example, arc 7'-10' on follower 2 and divide by the corresponding number of turns made by drum 4 as indicated by counter 6.

When working with thin materials, it is easy to measure the angular distance covered on follower 2 corresponding to a very large number of turns; this enables a determination of the average thickness with greater precision.

Note that the process employed here only gives a count of the displacements. It is, therefore, not sensitive to variations in speed which may occur during counting.

It gives only an average thickness value over a certain distance, but this is no inconvenience here, since the radiation counters likewise give only an average value, based on chronometric integration, hence, values over a distance which vary as a function of the speed. This applies particularly when it is used, as explained later, to correct the original displacement of the characteristic curve of the rolling mill, after wear takeup. In conjunction with rolling mill regulating devices operating on the basis of pressure measurement, these devices enable one to very quickly compensate for any deformations due to the load variations caused by differences in the thickness or the hardness of the product to be rolled.

Figure 4:
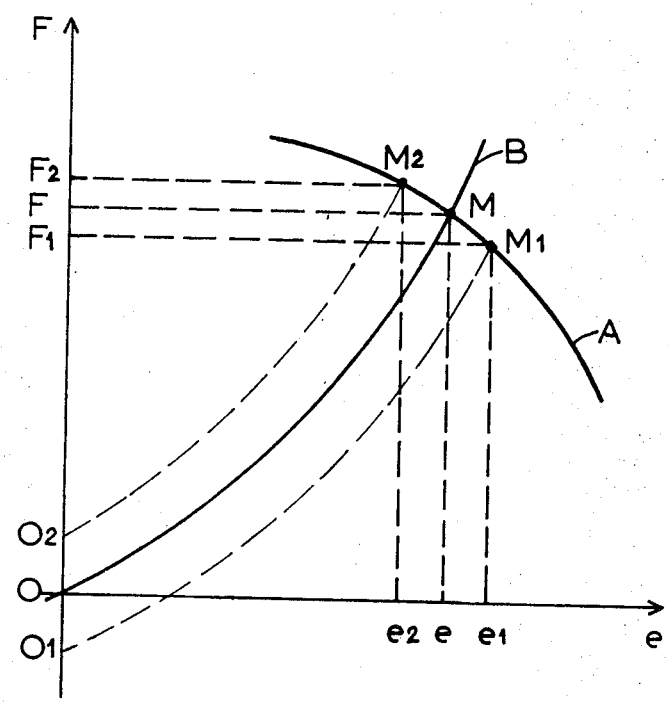
FIG. 4 is a diagram of the variations in the strip thickness as a function of the rolling efforts.

In effect, FIG. 4 shows two coordinate axes on which are plotted the thicknesses of the rolled product on the abscissa and the necessary rolling forces on the ordinate.

These two straight lines intersect at point 0 through which runs the characteristic curve B of the rolling mill. Curve A, the characteristic curve for the rolled product, will then cut the other one at a point M, so that—after adjustment of the rolling mill—the product that is introduced with a thickness $e_0$ will come out again with a thickness $e$. A force F corresponds to that point M. This product changes slowly according to a law that cannot be predicted during the day. As a result of the small variations, such as variations in the temperature of the different units and parts, for instance, the cylinders, the rolled product, the amount of tightening, etc., the characteristic B will move parallel to itself. Point M will move on curve A from $M_1$ to $M_2$, for example, moving the origin 0 from $0_1$ to $0_2$. During these small and slow movements, the thickness of the rolled product will vary from $e_1$ to $e_2$ and the rolling force will vary from $F_1$ to $F_2$.

The process involved in this invention enables us to return the origin of curve B to point 0 and to keep the thickness of the product at a constant value $e$.

Any device which uses this procedure can be so controlled as to give us an instantaneous reading of the thickness by using an analog computer 11 of known type to measure the derivative of the increase in the radius of the strip on the drum with relation to the linear path it travels, as indicated by followers or rollers 2-2' through lines 12 and 13, and an appropriate corrective control signal may be fed to the mill roller pressure applying means 15 through line 14.

What is claimed is:

1. A method for measuring on the exit side of a mill, the thickness of a continuously laminated strip during coiling on a drum, said method comprising comparing the angular rotation of said drum corresponding to movement of different linear portions of said laminated strip between said mill and said drum with the difference in angular rotations of said drum being indicative of the average thickness of said strip.

2. The method as claimed in claim 1 wherein the length of the different portions of said strip is determined by measuring the angular rotation of a roller in contact with said linearly moving strip and driven thereby.

3. Apparatus for measuring the thickness of a continuously moving strip as it is being reeled up on a drum into compact abutting coils, said apparatus comprising: means for measuring the movement of said strip in terms of angular rotation of a roller driven thereby, and means for comparing the lengths of material coiled during equal angular rotations of said drum at two different instances of time.

4. The measuring apparatus as claimed in claim 3 wherein said means for measuring the angular displacement of said strip during coiling comprises a first counter driven by said drum and measuring first and second angular displacements of said drum and wherein said means for measuring in terms of angular rotation, the movement of said strip to define a predetermined portion, comprises a second counter coupled to said roller which contacts said strip at a point displaced from said area of strip coiling.

5. The apparatus as claimed in claim 3 wherein said first counter emits a first signal at the start, and a second signal at the end of each predetermined angular measurement value, and wherein a third signal is emitted by said counter upon the expiration of a time interval expressed by a similar predetermined angular value, with the interval between said second and third signals corresponding to two different successive values of strip length, whereby the third signal in fact constitutes a thickness measurement signal following immediately after said interval.

6. The apparatus as claimed, in claim 5 wherein the signals emitted by said first counter reach said second counter in a manner such that the first counter successfully picks up and then releases values that are proportional to the real strip length corresponding to the predetermined angular measurement value but at different phases of strip coiling and the corresponding signals picked up by the second counter introduces directly, in terms of angular value, on the second counter, a quantity that is proportional to the average thickness of that portion of the strip just being coiled.

7. The apparatus as claimed in claim 4 further including means for comparing the cumulative count of said counter coupled to said drum coiler and the counter coupled to said roller, with the consistency and variation between said counts being indicative of the constancy of degree or variation of the average thickness of the moving strip.

8. The apparatus as claimed in claim 4 wherein said first and second predetermined angular measurement values are equal to each other and equal to at least one turn of the drum.

9. The apparatus as claimed in claim 4 further including an analog computer coupled to and receiving signals simultaneously from said first and second counters for indicating the instantaneous value of strip thickness.

10. The apparatus as claimed in claim 7 for use in a rolling mill including rolling mill regulating means for adjusting strip thickness, said apparatus further including: means for transmitting signals indicative of constancy of degree or varation in the average thickness of the moving strip to said rolling mill regulating means for automatically maintaining thickness of the process strip.

References Cited

UNITED STATES PATENTS

| | | | |
|---|---|---|---|
| Re. 25,075 | 10/1961 | Hessenberg | 72—2 |
| 1,145,880 | 7/1915 | Clark | 72—17 |
| 2,265,539 | 12/1941 | Nagel | 72—16 X |
| 3,169,424 | 2/1965 | Branscom et al. | 72—8 |
| 3,387,471 | 6/1968 | Freedman | 72—12 X |

MILTON S. MEHR, Primary Examiner

U.S. Cl. X.R.

72—16